United States Patent [19]

Edajima

[11] Patent Number: 4,802,379
[45] Date of Patent: Feb. 7, 1989

[54] TRANSFER MECHANISM FOR NUCLEAR REACTOR INSTRUMENTS

[75] Inventor: Toshikazu Edajima, Kobe, Japan

[73] Assignee: Mitsubishi Denki Kabushiki Kaisha, Tokyo, Japan

[21] Appl. No.: 109,787

[22] Filed: Oct. 16, 1987

[30] Foreign Application Priority Data

Oct. 16, 1986 [JP] Japan .................. 61-157382[U]

[51] Int. Cl.⁴ .................. F16C 1/00; G21C 19/00
[52] U.S. Cl. .................. 74/502.6; 226/110; 242/80; 254/389; 376/245; 376/463
[58] Field of Search .......... 376/260, 245, 247, 254, 376/340, 341, 342, 463; 226/109, 110; 242/25 R, 80; 254/389, 134.3 R; 251/129.2; 137/870, 625.48; 104/35, 36, 130, 138.1; 105/28; 193/31 R; 198/366; 74/501 F

[56] References Cited

U.S. PATENT DOCUMENTS

| | | | |
|---|---|---|---|
| 1,622,011 | 3/1927 | Thomas | 137/870 |
| 2,711,653 | 6/1955 | Zero | 74/501 F |
| 3,036,966 | 5/1962 | Le Flem | 376/463 |
| 3,766,005 | 10/1973 | Erkens | 376/245 |
| 4,156,373 | 5/1979 | Juy | 74/501 F |
| 4,253,914 | 3/1981 | Fogelberg | 376/245 |
| 4,326,624 | 4/1982 | Ewertowski et al. | 104/35 |
| 4,542,698 | 9/1985 | Wakabayashi | 104/130 |
| 4,669,679 | 6/1987 | Pali | 242/25 A |

Primary Examiner—Charles T. Jordan
Assistant Examiner—Daniel Wasil
Attorney, Agent, or Firm—Sughrue, Mion, Zinn, Macpeak and Seas

[57] ABSTRACT

An elongate selector member 16 having a Y-shaped passage 16a extending through it is rotatably mounted in a hollow cylindrical housing 12 and driven or switched between fixed limit positions by an actuator 17 to establish a continuous insertion/withdrawal path for a flexible cable between an inlet guide tube 11 and either one of two outlet guide tubes 19a, 19b.

5 Claims, 2 Drawing Sheets

TRANSFER MECHANISM FOR NUCLEAR REACTOR INSTRUMENTS

BACKGROUND OF THE INVENTION

This invention relates to a mechanism for selectively transferring between predetermined paths pursuant to the insertion of a measurement or monitoring instrument into the core of a nuclear reactor.

The monitoring of a nuclear reactor in a power station or the like to determine such parameters as neutron flux density and distribution, temperature, etc. is necessarily performed remotely to minimize radiation exposure risks, and is commonly implemented by the insertion of a flexible elongate cable, similar to a medical catheter, into the core of the reactor. The cable mounts or embodies an appropriate measuring instrument/device at its remote end.

To enable a plurality of different core sites to be sequentially accessed, a branching out network of cable insertion paths is typically provided, with a path transfer mechanism being disposed at each branch point similar to a railway track switch.

A conventional such transfer mechanism is shown in FIGS. 1 and 2, wherein the bulbous, swivel end portion of an inlet guide pipe or tube 1 for a monitoring cable extends through an access slot in a rectangular housing 2 and is disposed within the flared end of a guideway 9 defined in and extending through a selector block 3 slidably disposed in the housing. A pair of spaced outlet guide tubes 5a, 5b communicate with equally spaced apertures extending through the opposite or lower sidewall of the housing via coupler fittings 6. The distal ends of the outlet tubes extend either directly or via further branch paths to measurement sites within the reactor core (not shown). An electromagnetic actuator 4, such as a solenoid, selectively drives the block 3 between the limit positions shown in FIGS. 1 and 2 via a core rod 7 to thus establish communication or a continuous insertion path between the inlet tube 1 and one of the outlet tubes 5a, 5b. An adjustable stopper 8 is provided to establish the limit position of the selector block 3 shown in FIG. 2, wherein the cable insertion/withdrawal path leads through the outlet tube 5b.

Such a conventional transfer mechanism construction requires very precise and thus costly machining due to the close tolerances that must be provided between the slide surfaces of the selector block 3 and corresponding surfaces of the housing 2. Moreover, even with such closely machined tolerances, contaminant powders and abrasive particles frictionally dislodged during the numerous insertions and withdrawals of the monitoring cable become increasingly trapped in the interface between the block 3 and the housing 2, which leads to excessive wear, malfunctioning, and transfer position inaccuracies. Finally, with such a conventional construction the inlet tube 1 must necessarily be bent at some point along its length during each transfer operation in order to assume the different angular orientations shown in FIGS. 1 and 2, which leads to premature fatigue ruptures and requires frequent maintenance inspections.

SUMMARY OF THE INVENTION

These drawbacks and disadvantages are overcome in accordance with the present invention by rotatably mounting a selector member within a hollow cylindrical housing, the selector member having a Y-shaped passage extending diametrically therethrough to establish a continuous cable insertion/withdrawal path between an inlet guide tube axially aligned with a radial aperture extending through a sidewall of the housing and either one of two outlet guide tubes similarly aligned with spaced apertures in a diametrically opposite sidewall of the housing. The opposite ends of the selector member are spaced from the inner sidewall(s) of the housing to avoid any abrasive wear or jamming by dislodged contaminant particles.

DETAILED DESCRIPTION OF THE PREFERRED EMBODIMENTS

Figure 1:
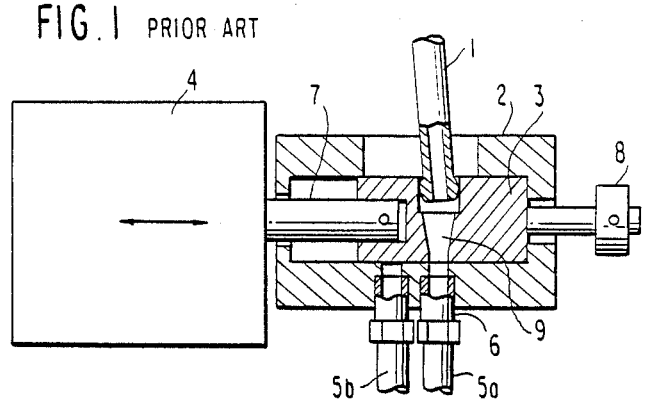
FIGS. 1 and 2 show sectional views of a conventional transfer mechanism, in different path positions.
Figure 2:
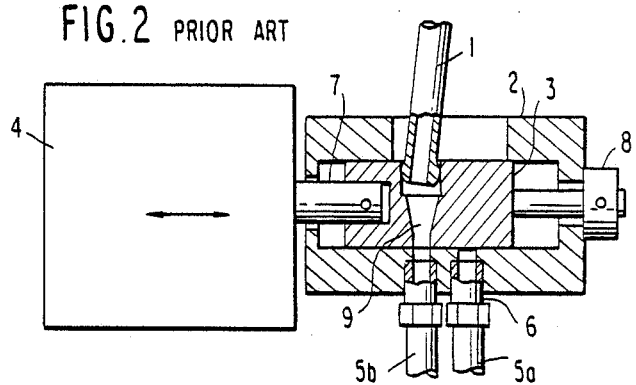
Figure 3:
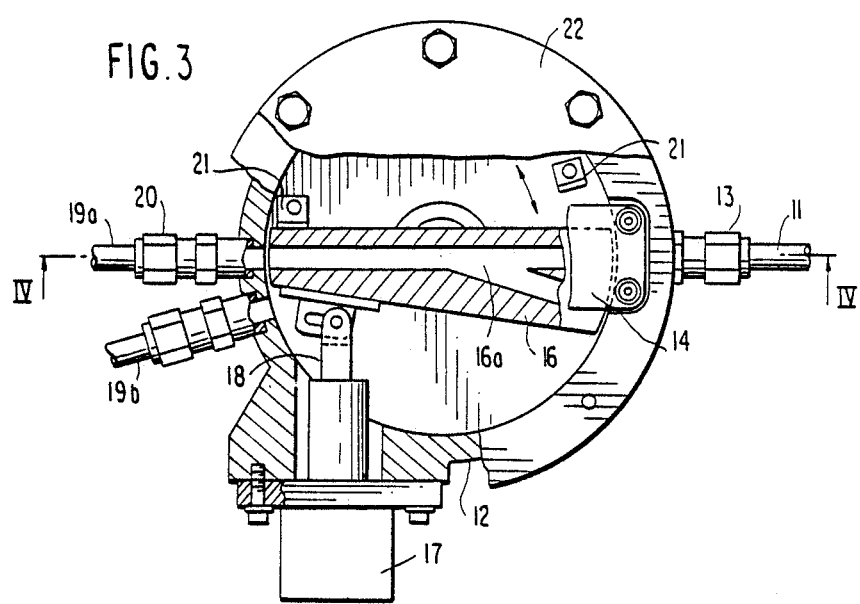
FIG. 3 is a plan view, partly in section, of a transfer mechanism in accordance with the present invention.
Figure 4:
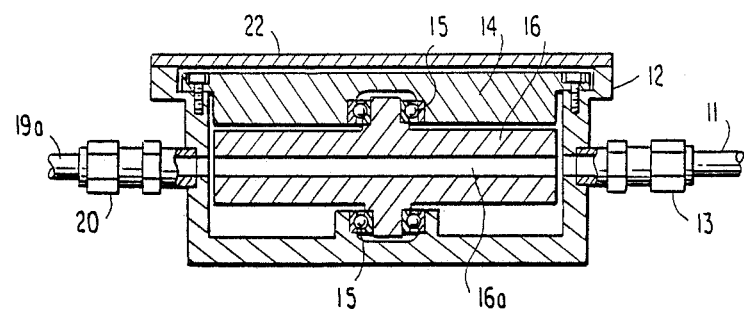
FIG. 4 is a sectional elevation taken along line IV-IV in FIG. 3.
Figure 5:
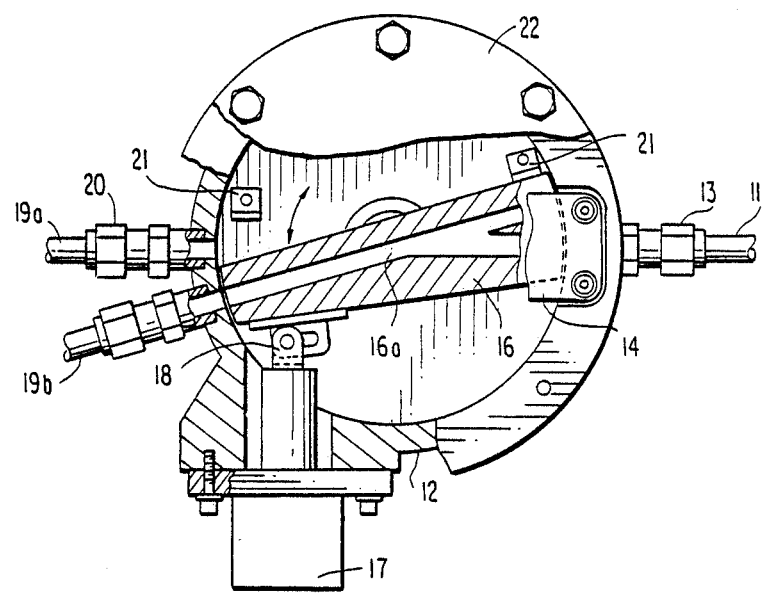
FIG. 5 is a plan view similar to that of FIG. 3, showing the transfer mechanism actuated to a different path position.

Referring to FIGS. 3 through 5, an inlet guide tube 11 for a monitoring cable (not shown) is mounted to the outer sidewall of a cylindrical housing 12 by a threaded coupler 13 in axial alignment with a circular aperture extending through such sidewall as seen in FIG. 4. Two spaced and angularly oriented outlet guide tubes 19a, 19b are similarly mounted to an opposite sidewall of the housing by couplings 20 in axial alignment with circular radial apertures extending through the sidewall, outlet tube 19a being disposed diametrically opposite the inlet tube 11. A diametrically oriented selector member 16 having a Y-shaped, branched guide passage 16a extending therethrough is rotatably mounted within the housing by upper and lower sealed ball bearings 15 respectively disposed within a recess in a support member 14 extending across the top of the housing and in a cup centrally upstanding from the bottom of the housing. The curved, diametrically opposite ends of the selector member 16 are slightly spaced from the inner peripheral wall of the housing 12 to avoid any abrasive wear or jamming due to contaminant particles dislodged from or withdrawn by the monitor cable. An actuator 17 mounted to a sidewall of the housing controls the movement or switching of the selector member 16 via a coupling rod 18, and the limit positions of the selector member are established by abutment stops 21 upstanding from the bottom of the housing. A circular cover plate 22, which may be easily removed for cleaning and maintenance, closes the open upper end of the housing.

The operation of the transfer mechanism to establish a desired cable insertion/withdrawal path from the inlet guide tube 11 to either one of the outlet guide tubes 19a, 19b by appropriately controlling the actuator 17 to rotate the selector member 16 between its defined limit positions is readily apparent from a comparative glance at FIGS. 3 and 5.

Obvious modifications within the scope of the invention include chamfering or rounding the edges of the housing sidewall apertures and those of the insertion path 16a within the selector member to avoid any misalignment hangups during the insertion of the monitoring cable, and the mounting of the abutment stops 21 directly within the actuator 17 instead of within the housing. Further, although only two outlet tubes have been shown and the passage 16a is Y-shaped, three or more such outlet tubes could obviously be provided in combination with a trident shaped or multi-tined passage.

What is claimed is:

1. A transfer mechanism for establishing an insertion/withdrawal path for a flexible monitoring cable between an inlet cable guide tube (11) and at least two outlet cable guide tubes (19a, 19b) pursuant to the measurement of variable parameters within a nuclear reactor core, comprising:
   (a) a hollow cylindrical housing (12) having an inlet aperture in a sidewall thereof and at least two spaced outlet apertures in a generally diametrically opposite sidewall,
   (b) coupling means (13, 20) for individually connecting the inlet and outlet tubes to the inlet and outlet apertures in axial alignment therewith,
   (c) a selector member (16) rotatably mounted within the housing and having a branched guide passage (16a) defined therein and extending therethrough, said passage having a single outlet disposed proximate said outlet apertures and at least two inlets disposed proximate said inlet aperture, and
   (d) actuator means (17) operatively coupled to the selector member for selectively rotating said member between at least two stop positions whereat a continuous cable insertion/withdrawal path is established between the inlet tube and either one of the outlet tubes.

2. A transfer mechanism according to claim 1, wherein opposite ends of the selector member are spaced from associated inner sidewalls of the housing.

3. A transfer mechanism according to claim 2, wherein there are two outlet tubes and outlet apertures, and the guide passage defined in the selector member is Y-shaped.

4. A transfer mechanism according to claim 2, wherein a plurality of abutment members (21) are mounted to the transfer mechanism to individually define said stop positions.

5. A transfer mechanism according to claim 2, wherein the inlet and outlet tubes and apertures are radially oriented with respect to the housing.

* * * * *